United States Patent [19]

Viel

[11] 4,206,812
[45] Jun. 10, 1980

[54] ROTARY ROCK WINDROWER

[76] Inventor: Floyd W. Viel, P.O. Box 632, Billings, Mont. 59103

[21] Appl. No.: 828,214

[22] Filed: Aug. 26, 1977

[51] Int. Cl.$^2$ ............................................. A01B 43/00
[52] U.S. Cl. .................................................... 171/63
[58] Field of Search ...................... 171/63, 65; 56/384, 56/386, 228; 37/2, 141

[56] References Cited

U.S. PATENT DOCUMENTS

| | | | |
|---|---|---|---|
| 1,325,580 | 12/1919 | Reiter | 171/63 X |
| 1,406,063 | 2/1922 | Nagy | 171/63 |
| 1,666,836 | 4/1928 | Santee | 171/65 |
| 2,179,583 | 11/1939 | Wilson | 171/63 |
| 2,479,719 | 8/1949 | Boylan | 171/65 |
| 2,672,721 | 3/1954 | Adams | 56/384 |
| 2,679,701 | 6/1954 | Busque | 37/2 |
| 2,906,351 | 9/1959 | Johnson | 171/63 |
| 2,938,586 | 5/1960 | Gaffney | 171/63 |
| 2,971,587 | 2/1961 | Anderson | 171/63 |
| 3,117,631 | 1/1964 | Fahrenholz | 171/63 |
| 3,142,144 | 7/1964 | Ronning | 56/228 |
| 3,192,653 | 7/1965 | Socin | 37/141 |
| 3,240,005 | 3/1966 | Rowse | 56/386 |
| 3,751,891 | 8/1973 | Molzahn et al. | 56/228 |
| 4,040,490 | 8/1977 | Anderson | 171/63 |

*Primary Examiner*—Russell R. Kinsey
*Attorney, Agent, or Firm*—Berman, Aisenberg & Platt

[57] ABSTRACT

An improved rock windrower which includes a frame assembly, a reel adapted to be rotated within the frame assembly and having a plurality of windrowing teeth extending therefrom. The frame and reel are adapted to be angularly disposed relative to the draft direction of a towing vehicle. The improved windrower features disposition of the implement teeth in a direction substantially parallel to the draft direction of the towing vehicle upon impact of the teeth with the ground. Such an angle results in a full opening between adjacent teeth which in turn permits cleaner rock windrowing and further provides additional strength. Another feature of the improved windrower includes the provision of a pair of wheel assemblies that are angularly disposed in the draft direction of the towing vehicle and which may be placed at any desirable position on the rear frame of the windrower during a windrowing operation by means of a pair of easily secured bolt hole plates. An auxiliary pair of bolt hole plates are associated with each of the wheel assemblies for securing the latter to the front and rear frames in any desired position during the transport mode of the windrower. The tongue assembly of the windrower also features a dual bolt hole plate construction for use both during the windrowing and transport modes of operation.

16 Claims, 6 Drawing Figures

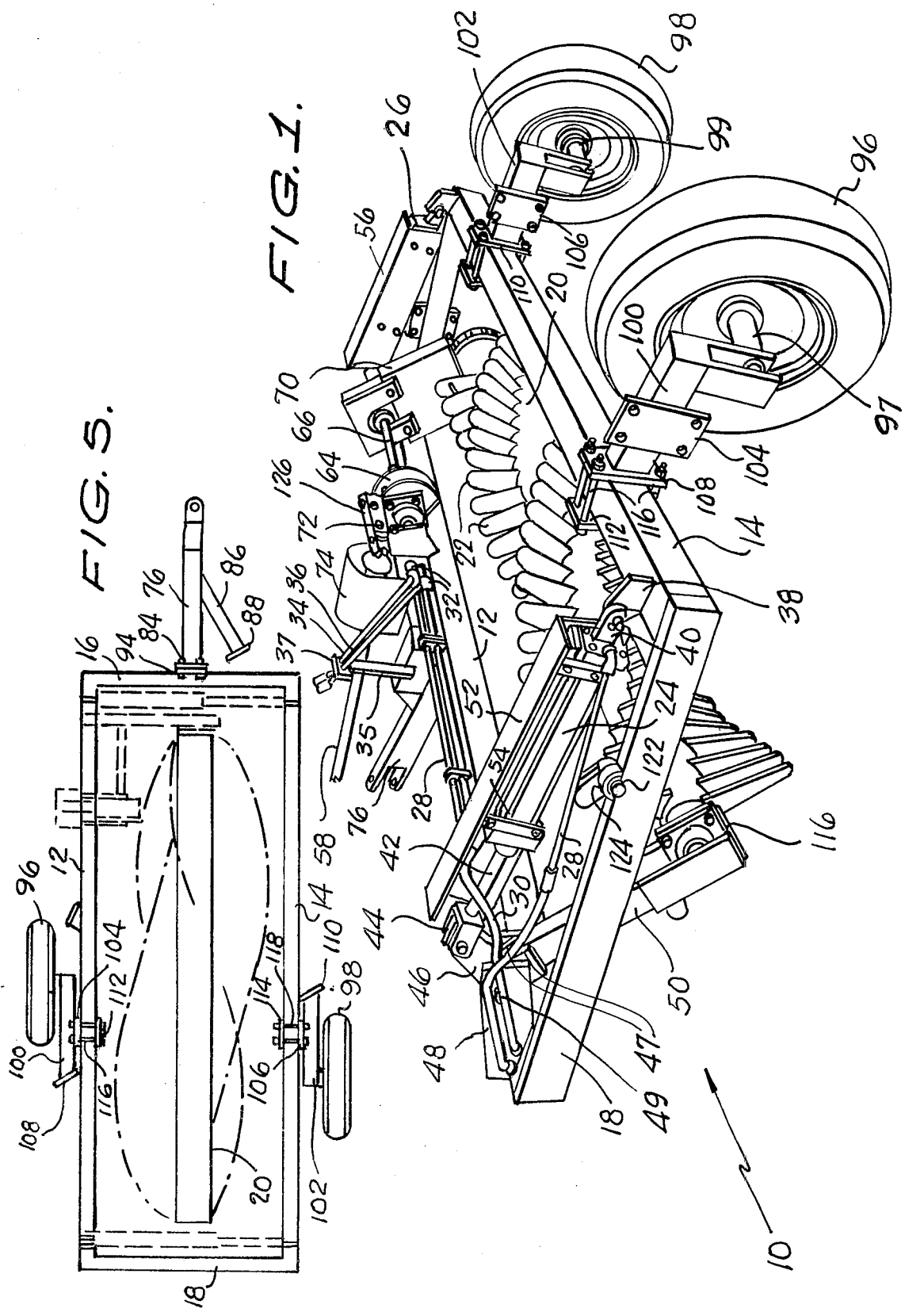

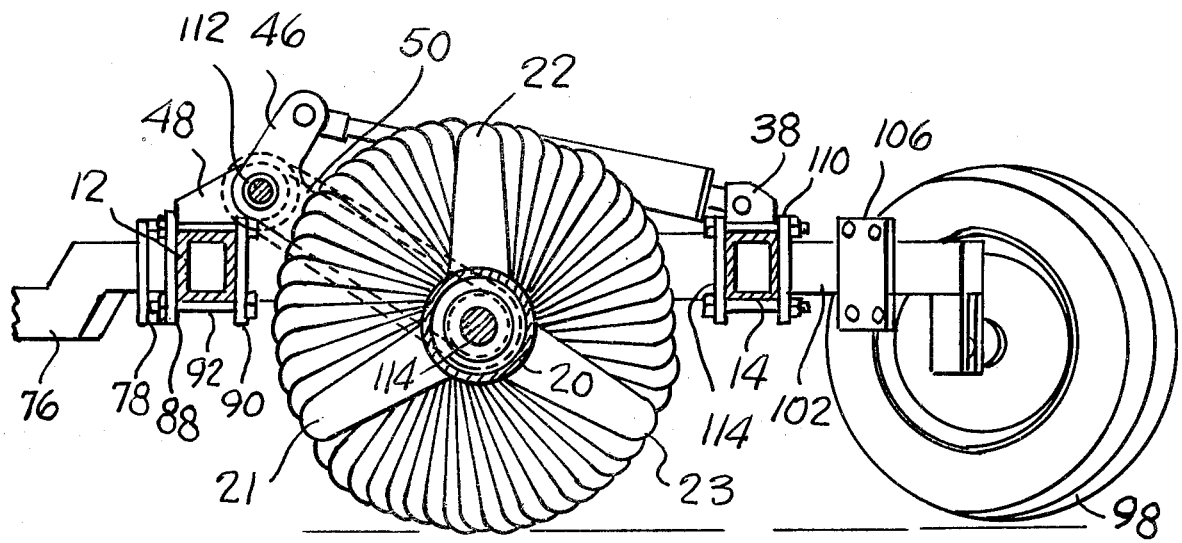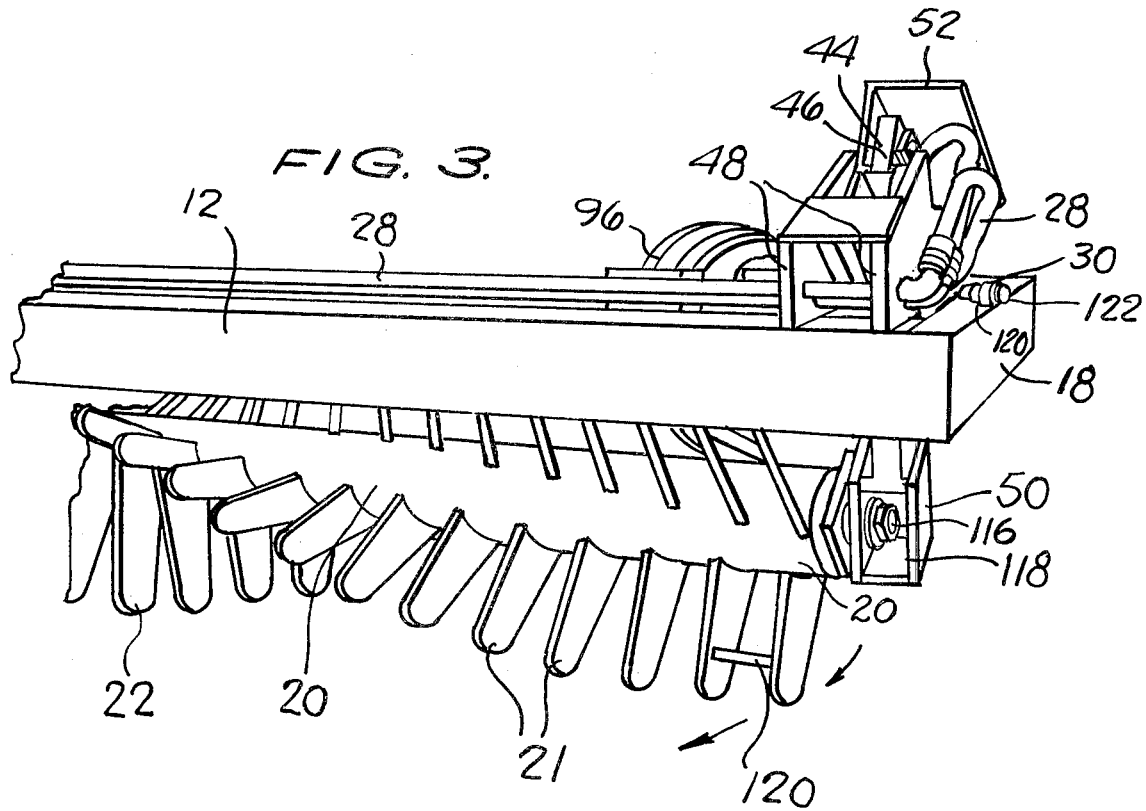

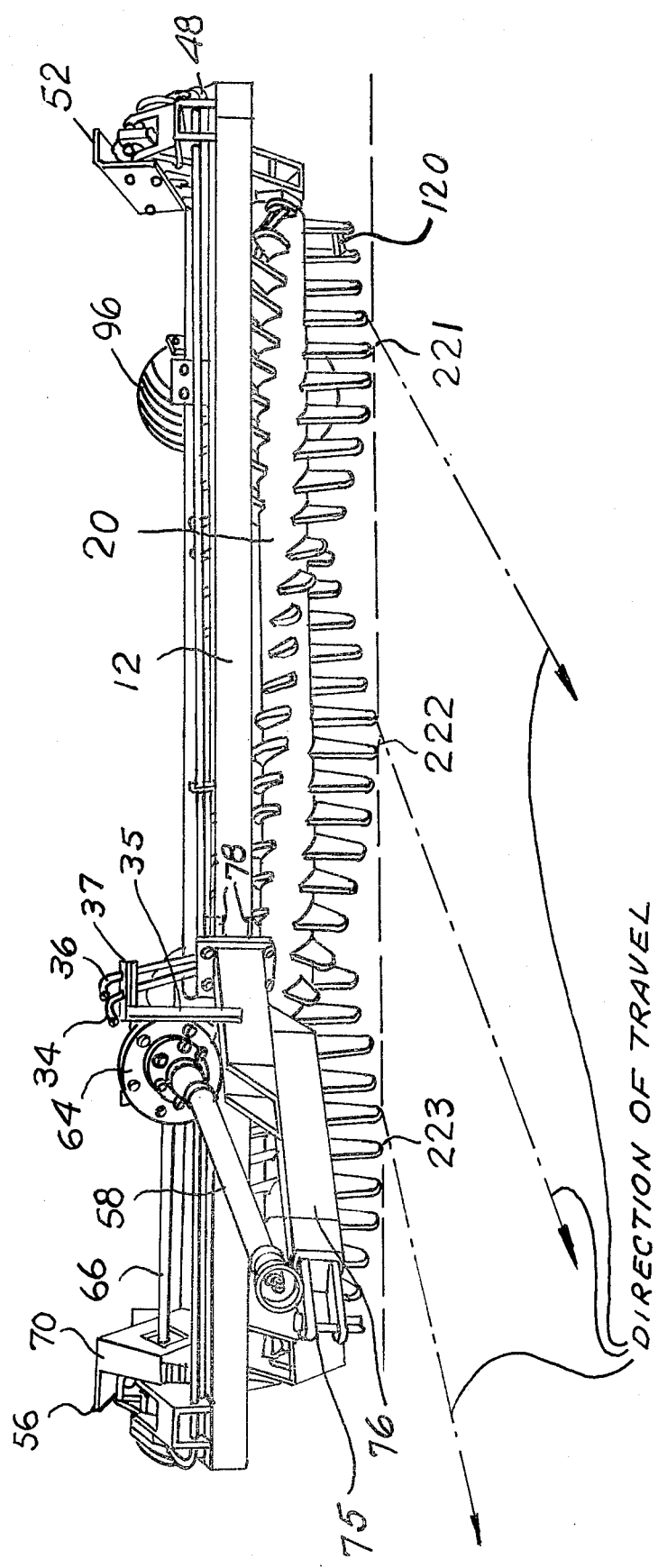

ROTARY ROCK WINDROWER

BACKGROUND OF THE INVENTION

1. Field of the Invention

The present invention is related to rock windrowers and, more particularly, is directed towards a rotary rock windrower wherein the rotating reel is angularly disposed with respect to the draft direction of the towing vehicle.

2. Description of the Prior Art

The structure and operation of a classic rotary rock windrower is exemplified by U.S. Pat. No. 2,938,586 to V. H. Gaffney. As described therein, a rock windrower is an agricultural implement designed to be pulled by a tractor through plowed fields having a multitude of variously sized rocks, and is designed to move the rocks easily and efficiently into a windrow so that they may be more easily removed from the field. A rotating shaft or reel has two or three spiral rows of teeth affixed thereto. The elevation of the rotary member is controlled by a hydraulic cylinder. The rotating member is set at an angle to the line of draft and is rotated from power available in the towing vehicle. The rocks are worked along the rotary member by its forward translation through the field, the rotary motion of the reel, and the angle at which it is set with respect to the line of draft. As explained in the Gaffney patent, as the rotary member is operated, the rocks move longitudinally along the member, each rock being given a series of small "kicks" by the teeth of the rotary member until the rocks are discharged at the end of the rotary member farthest from the tractor, leaving them in a neat windrow.

One problem which I have discovered with respect to the prior art rotary rock windrowers with angularly disposed reels may be traced to the particular orientation of the implement teeth on the rotating member. Generally, the teeth are elongated, substantially planar members which extend substantially perpendicularly to the rotating reel to which they are attached. During operation, however, with the frame of the windrower angularly disposed, such an orientation of teeth does not provide any gap between adjacent teeth relative to the draft direction through which dirt, trash, or other debris may pass. This tends to collect trash, dirt, and the like, thereby slowing operation and lessening overall windrowing efficiency. Although rotary rock windrowers are known whose reels are perpendicular to the line of draft, and hence whose teeth are parallel thereto, it is believed far preferable to have the reel angularly disposed since the rocks roll off easier into the windrowed pile and the machine is thus subjected to less wear, tear and resistance. It would clearly be desirable if a rotary rock windrower could be provided whose reel is angularly disposed to the draft direction yet whose teeth are oriented to provide a full gap therebetween.

Another deficiency with respect to prior art rock windrowers relates to the optimum placement of the wheel assemblies on the windrower frame. The prior art teaches fixed placement of the wheel assemblies. However, it is clear to me that the best possible placement of such wheel assemblies can vary from field to field, in accordance with the texture of the ground over which the windrower is to be operated. It would be clearly advantageous, therefore, if the position of wheel assemblies in a rock windrower could be selected as desired for the particular field being worked.

Generally, rock windrowers are convertible between a windrowing mode and a transport mode. In the latter mode, the windrower is converted to a more compact unit for transport and is generally pulled longitudinally of the windrowing direction. It is therefore necessary to provide wheel assemblies for such units which may be easily converted between the windrowing and transport modes. The prior art windrowers, in disclosing permanently mounted wheel assemblies, limits the convertability thereof to the transport mode and makes selection of wheel placement a concommitantly difficult operation. It is also desirable, although to a lesser degree than during windrowing, to be able to select the particular placement of the wheels on the frames of the windrower during transport, as a result of varying road conditions, variance in the draw bar heights of towing vehicles, and the like.

It would also be highly desirable if means could be provided for the connecting tongue between the windrower frame and the towing vehicle for easily changing the position of same between the windrowing mode and the transport mode.

Other U.S. patents of which I am aware in this general art area include: U.S. Pat. Nos. 1,325,580; 1,666,836; 2,178,583; 2,479,719; 2,672,721; 2,679,701; 3,142,144; 3,192,653; 3,240,005; and 3,751,891.

OBJECTS AND SUMMARY OF THE INVENTION

It is therefore a primary object of the present invention to provide a new and improved rotary rock windrower wherein the rotating reel is angularly disposed with respect to the draft direction of the towing vehicle, and wherein the implement teeth extending from the reel are more advantageously disposed than in prior art rock windrowers.

A general object of the present invention is to overcome all of the deficiencies noted above with respect to prior art rotary rock windrowers.

Another object of the present invention is to provide a rotary rock windrower which includes a novel and unique set of wheel assemblies which may be mounted in any desired position on the windrower frame.

An additional object of the present invention is to provide a new and improved rotary rock windrower wherein the attachment of the wheel assemblies to the windrower frame may be easily and quickly changed between a windrowing mode and a transport mode.

A still further object of the present invention is to provide a rotary rock windrower having a tongue assembly which may be installed and easily changed between a windrowing mode and a transport mode.

The foregoing and other objects are attained in accordance with one aspect of the present invention through the provision of a rotary rock windrower which comprises a frame assembly and a reel rotatingly mounted in the frame assembly and having a plurality of substantially planar, elongated teeth extending radially therefrom. Means are also provided for connecting the frame assembly to a towing vehicle so as to dispose the reel at a non-perpendicular angle with respect to the draft direction of the towing vehicle. The plurality of teeth are connected to the reel in such a fashion that when positioned adjacent the ground the plane of the teeth are substantially parallel with the draft direction of the towing vehicle.

In accordance with other aspects of the present invention, the frame assembly includes a front frame to which the connecting means are attached, a rear frame substantially parallel with the front frame, and a pair of side frames connecting the respective ends of the front and rear frames. The reel is disposed between and substantially parallel to the front and rear frames, and means are pivotally connected between the front and rear frames for raising and lowering the reel. A power take-off from the towing vehicle is coupled to the reel by, for example, a conventional sprocket and chain assembly for rotating the reel as desired.

In accordance with other aspects of the present invention, the connecting means comprises a tongue assembly having a clevis formed at one end thereof for connection to the towing vehicle, and a first bolt hole plate perpendicularly mounted at the other end thereof. A second bolt hole plate is secured to the front frame at an angle perpendicular to the draft direction of the vehicle, the first and second bolt hole plates adapted to be secured together during the windrowing operation. The connecting means preferably further comprises an angle brace connected between the tongue assembly and the front frame and having third and fourth bolt hole plates associated therewith for securing the brace perpendicularly to the front frame. One of the side frame preferably includes another bolt hole plate secured thereto for receiving the first bolt hole plate of the tongue assembly when the rock windrower is arranged in a transport mode.

In accordance with yet other aspects of the present invention, a pair of substantially identical wheel assemblies that are angularly disposed in the draft direction of the towing vehicle are also provided, each of which include means for adjustably mounting same to any desired position along the rear frame during operation of the rock windrower. The wheel assemblies each include means for mounting same to the front and rear frames when the rock windrower is arranged in a transport mode. More particularly, each of the wheel assemblies comprises a wheel, an elongated support arm, the other end of the support arm including a bolt hole plate mounted thereto at the non-perpendicular angle, and adapted to be secured about the rear frame by another bolt hole plate and a plurality of connecting bolts. For use in the transport mode, each of the support arms further includes a second bolt hole plate secured thereto and being parallel with the wheel, the second bolt hole plate cooperating with additional bolt hole plates for securing the wheel assemblies to the frames in the transport mode wherein the wheels are aligned substantially parallel with the front and rear frames.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a rear, perspective view of a preferred embodiment of a rotary rock windrower according to the present invention;

FIG. 2 is a cross-sectional view of the preferred embodiment illustrated in FIG. 1;

FIG. 3 is a fragmentary, front perspective view illustrating some of the components of the preferred embodiment of the present invention shown in FIG. 1;

FIG. 5 is a diagrammatic, top view on a reduced scale of the preferred embodiment of the present invention shown in an alternate, transport mode; and FIG. 6 is a front view of the preferred embodiment illustrated in FIG. 1 particularly well-suited for illustrating the manner of attachment of the implement teeth to the rotating reel.

DETAILED DESCRIPTION OF THE PREFERRED EMBODIMENT

Figure 4:
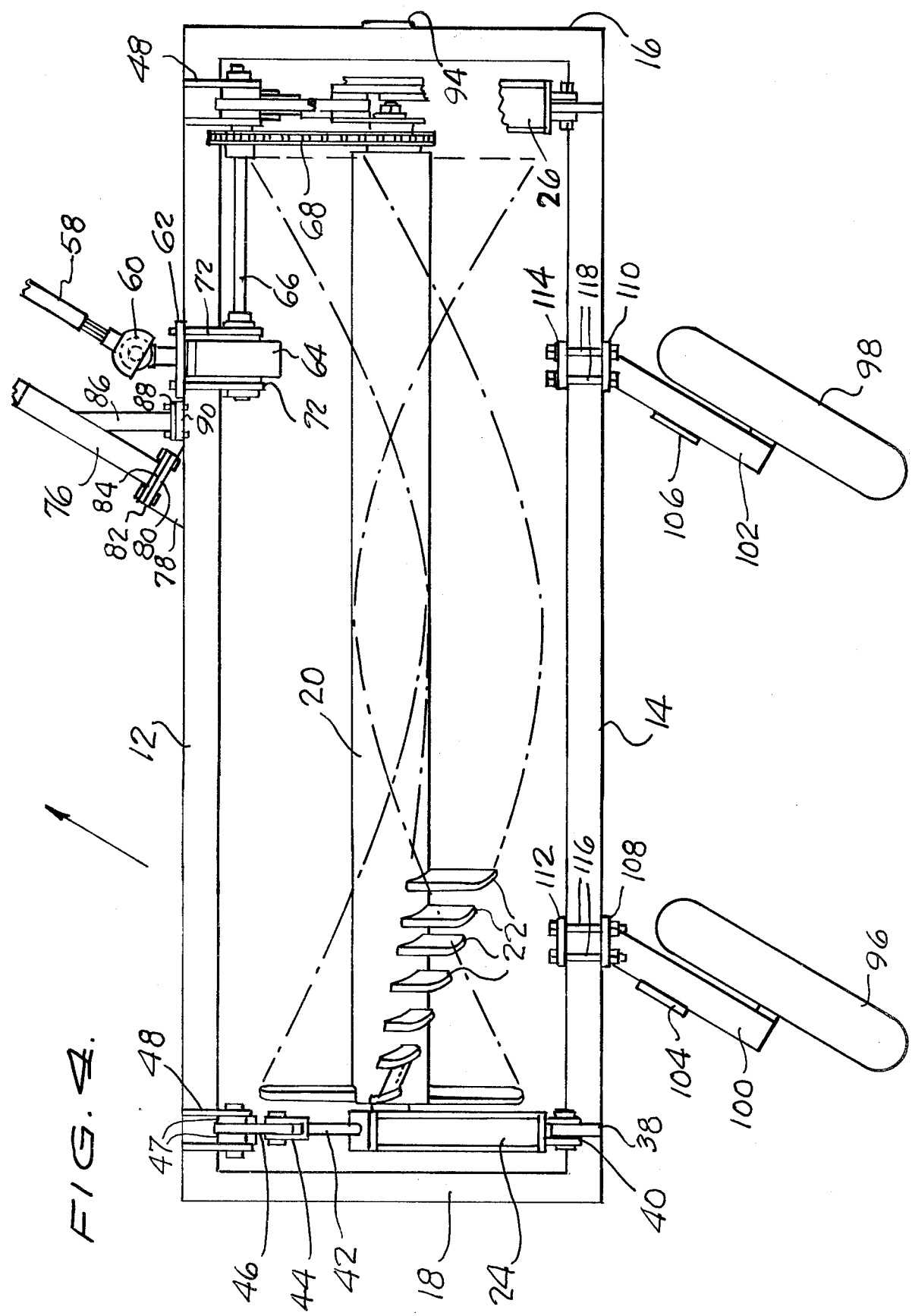
FIG. 4 is a top, partially broken view of the preferred embodiment of the present invention shown in FIG. 1.

Referring now to the drawings, wherein like reference numerals represent identical or corresponding parts throughout the several views, and more particularly to FIGS. 1 through 4, a preferred embodiment of the rotary rock windrower of the present invention is indicated generally by reference numeral 10.

The windrower 10 includes a frame assembly preferably comprised of square tubing and including a front frame 12, a substantially parallel rear frame 14, and a pair of side frames 16 and 18 which connect the ends of front and rear frames 12 and 14.

Disposed within the frame assembly and oriented substantially parallel with the front and rear frames 12 and 14 is a rotary member or reel 20 which includes a plurality of implement teeth radially extending therefrom.

In a preferred embodiment, as perhaps best illustrated in FIG. 2, the present invention includes three sets 21, 22 and 23 of spiraled teeth mounted on reel 20. Each of the implement teeth are on the order of ¾ inch thick and are preferably cut from a special alloy high carbon cold rolled steel to provide resistance against abrasion, impact strain, and wear. The teeth 21, 22 and 23 are preferably rounded at their ends and hard surfaced for durability. A brace 120 (FIG. 3) may be disposed between the two teeth at the end of each spiral 21, 22 and 23 of teeth for additional support. The teeth 21, 22 and 23 are welded to the reel 20 at a particular angular orientation with respect to the draft direction of the towing vehicle, in a manner to be described in greater detail hereinafter.

The reel 20 is mounted for rotation about a reel shaft 114 (FIG. 2) which is, in turn, preferably threaded at each end thereof in reverse directions. The threaded ends of the reel shaft 114 extend through apertures formed in a pair of oppositely disposed reel pivot arm assemblies 50. As illustrated in FIG. 3, one end 116 of the reel shaft 114 may be threaded, for example, by left turn threads and is secured to the reel pivot arm assembly 50 by a cooperating nut 118, while the distal end (not shown) of reel shaft 114 is formed with right turn threads and is secured by a cooperating nut to the sprocket end of the reel. With the reverse-threaded construction of the reel shaft 114, as the reel 20 revolves, the nuts are maintained tight at all times, thereby providing better control and improved overall windrowing action.

The reel 20 may be raised and lowered under the control of a pair of double-acting hydraulic cylinders 24 and 26 which are respectively mounted adjacent the side frames 16 and 18. Reference numerals 28 and 30 indicate a pair of hydraulic conduits for controlling the hydraulic cylinder 24. Conduits 28 and 30 mate with a similar pair of conduits for the corresponding cylinder 26 at a pair of T-connectors 32 to a pair of feed lines 34 and 36 which extend to the towing vehicle (not shown) for simultaneous control of the cylinders 24 and 26. A support bar 35 includes a strap 37 at the top portion thereof for securing conduits 34 and 36.

Inasmuch as the hydraulic cylinder 24 and supporting structure is substantially identical to hydraulic cylinder 26 and its supporting structure, description of the former will suffice for the latter. A bracket 38 is preferably welded to the rear frame 14 adjacent end frame 18 thereof. Cylinder 24 is pivotally mounted to the bracket 38 as by flanges 40. Reference numeral 42 indicates the forwardly extending piston 42 of hydraulic cylinder 24 to the distal end of which are mounted a pair of flanges 44. The flanges 44 are, in turn, pivotally mounted to a front pivot bracket 46.

A support bracket 48 is welded to the front frame 12 of the windrower 10 adjacent side frame 18 and has a pair of apertures extending near the forward end thereof through which hydraulic conduits 28 and 30 extend. At the rear end of bracket 48 is pivotally mounted pivot bracket 46 from which extends the reel pivot arm assembly 50. Mounted to the lower end of the reel pivot arm assembly 50, as explained hereinabove, is the reel shaft 114 of reel 20 through suitable sealed bearings and spacers for smooth and trouble-free rotation thereof.

Spaced forward plates 47 fixed on reel pivot arm assembly 50 are held together with a tube. A pin 49 is inserted through an aperture in bracket 48 and through the tube in forward plates 47 to permit pivoting of the arm assembly 50 thereabout. Pin 49 has a stub end and a threaded end with a nut to secure the latter. The nut is taken up to draw the walls of bracket 48 against the forward plates 47 to an ideal snugness that is tight enough to prevent forward plates 47 from wobbling and thus provides better control for improved windrowing action, and yet is not too tight to put the pivot into a bind.

Cylinder guards 52 and 56 are preferably provided for hydraulic cylinders 24 and 26, respectively, and may be held in place by appropriate bolt and strap assemblies 54.

The reel 20 is rotated by means of a drive mechanism that includes a drive shaft 58 which is coupled from a power take-off on the towing vehicle (not shown). When the towing vehicle RPM discourages use of the power take-off for rotating the reel, tractor hydraulics or a hydraulic motor may be utilized, both accompanied with orbitrol motors with flow dividers, if needed. The drive shaft 58 is coupled through a conventional pivot joint 60 (FIG. 4), an adjustable slip clutch 62, and a gear box 64 which cooperate to rotate a power shaft 66. The power shaft 66 actuates a conventional sprocket and chain drive assembly indicated generally by reference numeral 68 which is coupled to reel 20 in the manner perhaps best illustrated in FIG. 4. A chain guard 70 (FIG. 1) is also preferably provided for the sprocket and chain assembly 68 to prevent damage thereto during a windrowing operation. Still with reference to FIGS. 1 and 4, reference numeral 72 indicates mounting brackets for the gear box 64 to front frame 12, which reference numeral 74 refers to a guard for the joint 60 and slip clutch 62.

Referring now to FIGS. 2, 4 and 6, a towing tongue 76 includes a forwardly positioned clevis 75 for coupling to the towing vehicle either in the windrowing mode or transport mode. As illustrated in FIGS. 2, 4 and 6, the tongue 76 is mounted for a windrowing operation. To the distal end of tongue 76 is perpendicularly mounted a rectangular, substantially planar plate 84 having a plurality of bolt holes formed therethrough. Bolt hole plate 84 is designed to mate with a correspondingly formed bolt hole plate 82 which is secured to the forwardly projecting edges 80 of a pair of parallel plates 78 which are welded to the front frame 12 somewhat off-center thereof. The front edges 80 of the parallel plates 78 are cut perpendicular to the draft direction of the towing vehicle such that when the bolt plates 82 and 84 are coupled together, as illustrated in FIG. 4, the tongue 76 is aligned in the draft direction of the towing vehicle.

The tongue assembly 76 further preferably includes an angle brace 86 which extends rearwardly from one side thereof and is angled in a direction perpendicular to the front frame 12. At the free end of angle brace 86 is secured another bolt hole plate 88 which is designed, in turn, to mate with a correspondingly formed bolt hole plate 90 which is welded to the forward portion of the front frame 12. The angle brace 86 provides additional structural integrity and strength during the windrowing mode of operation.

The tongue 76 may also be utilized during the transport mode of operation, and for this purpose a further bolt hole plate 94 is preferably welded to the forward portion of side frame 16. Bolt hole plate 94 cooperates with the bolt hole plate 84 formed at the rear end of tongue assembly 76 during the transport mode of operation, as best viewed in FIG. 5, during which the rock windrower is moved in a direction so as to present its narrowest width.

Referring back to FIGS. 1 and 4, the rotary rock windrower of the present invention is preferably provided with a pair of support wheels 96 and 98 which are held by respective axles 97 and 99 mounted on the rear portion of a pair of wheel frame support arms 100 and 102, respectively. Wheels 96 and 98 are oriented parallel to the support arms 100 and 102.

Welded to the sides of support arms 100 and 102 are a pair of bolt hole plates 104 and 106. The front portion of support arms 100 and 102 are cut at the same angle as the draft direction of the towing vehicle. Welded to the front portion of arms 100 and 102 are another pair of bolt hole plates 108 and 110, respectively, which can be secured to any desired position along the rear frame 14 by means of cooperating bolt hole plates 112 and 114 and bolts 116 and 118, respectively.

Referring now to FIG. 5, the wheels 96 and 98 are illustrated as they would be mounted in the transport mode of operation of the rock windrower 10. Wheel 96 and associated support arm 100 are mounted to the front frame 12 by means of bolt hole plates 104, 112 and bolts 116. Wheel 98 is mounted to the rear frame 14 by means of bolt hole plates 106, 114 and bolts 118. Note that the wheels 96 and 98 may be adjustably positioned at any desired location along the frames 12 and 14 in the transport mode as well.

Also provided on the upper edge of side frames 16 and 18 are means for holding the reel 20 in an upward position during transport in the form of a pin 122 mounted within a tube 124.

Referring now to FIG. 6, there is illustrated a front view of the preferred embodiment of the present invention which perhaps best indicates the relative angle of mounting of the teeth sets 21, 22 and 23 to the reel 20. The teeth of the windrower are welded to the reel 20 at such an angle that, at the point of contact with the ground, the teeth are at the same angle as the operating angle of the rock windrower. In other words, for example, the lowermost teeth 221, 222 and 223 of teeth sets 21, 22 and 23, respectively, may be said to lie in a plane which is substantially parallel with the draft direction of the towing vehicle. Therefore, adjacent teeth, at their lowermost position, present a full opening therebetween for cleaner rock windrowing. That is, less resistance to forward movement is created, with concomitant less strain on the machine itself as well as on the towing vehicle. The open gap between adjacent teeth at their point of contact with the ground permits dirt and trash to pass through freely, providing for cleaner and more efficient operation, especially when coupled with the angular disposition of the reel 20 with respect to the draft direction.

Obviously, numerous modifications and variations of the present invention are possible in light of the above teachings. It is therefore to be understood that within the scope of the appended claims, the invention may be practiced otherwise than as specifically described herein.

I claim as my invention:

1. A rotary rock windrower, which comprises:
   a frame assembly;
   a reel rotatingly mounted in said frame assembly and having a plurality of substantially planar, elongated teeth extending radially therefrom;
   means for connecting said frame assembly to a towing vehicle so as to dispose said reel at a non-perpendicular angle with respect to the draft direction of said towing vehicle;
   said plurality of teeth being connected to said reel in such a fashion that when the teeth are positioned adjacent the ground the planes of said teeth are substantially parallel with said draft direction of said towing vehicle.

2. The rotary rock windrower as set forth in claim 1, wherein said frame assembly includes a front frame to which said connecting means is attached, a rear frame substantially parallel to said front frame, and a pair of side frames connecting the respective ends of said front and rear frames.

3. The rotary rock windrower as set forth in claim 2, wherein said reel is disposed between and substantially parallel to said front and rear frames.

4. The rotary rock windrower as set forth in claim 3, further comprising means pivotally connected between said front and rear frames for raising and lowering said reel.

5. The rotary rock windrower as set forth in claim 3, further comprising means connected to said front frame for rotating said reel.

6. The rotary rock windrower as set forth in claim 2, wherein said connecting means comprises a tongue assembly having a clevis formed at one end thereof and a first bolt hole plate perpendicularly mounted at the other end thereof, and a second bolt hole plate secured to said front frame at an angle perpendicular to said draft direction of said vehicle, said first and second bolt hole plates adapted to be secured together during operation of said rock windrower.

7. The rotary rock windrower as set forth in claim 6, wherein said connecting means further comprises an angle brace connected between said tongue assembly and said front frame and having third and fourth bolt hole plates associated therewith for securing said brace perpendicularly to said front frame.

8. The rotary rock windrower as set forth in claim 6, wherein one of said side frames includes a third bolt hole plate secured thereto for securedly receiving said first bolt hole plate of said tongue assembly when said rock windrower is arranged in a transport mode.

9. The rotary rock windrower as set forth in claim 1, wherein said first and second wheel assemblies further include means for mounting same to said front and rear frames, respectively, when said rock windrower is arranged in a transport mode.

10. The rotary rock windrower as set forth in claim 9, wherein each of said wheel assemblies comprises a wheel, an elongated support arm, and an axle mounting said wheel parallel to said support arm, the other end of said support arm including a bolt hole plate mounted thereto at said angle and adapted to be secured about said rear frame by another bolt hole plate and a plurality of connecting bolts.

11. The rotary rock windrower as set forth in claim 10, wherein each of said support arms further includes a second bolt hole plate secured thereto and being parallel with said wheel, said second bolt hole plates cooperating with additional bolt hole plates for securing said wheel assemblies to said frames in said transport mode wherein said wheels are aligned substantially parallel with said front and rear frames.

12. The rotary rock windrower as set forth in claim 2, further comprising a pair of pivot arm assemblies each having a pivot arm pivotally mounted to said frame assembly, hydraulic means extending between each of said reel pivot arms and said frame assembly for pivoting said reel pivot arms, said reel having a reel shaft extending therethrough and through each of said pivot arm assemblies, whereby said reel may be under positive control of said hydraulic means and may be raised or lowered by operation of said hydraulic means.

13. The rotary rock windrower as set forth in claim 12, wherein said reel shaft is right hand threaded at one end thereof and is left hand threaded at the other end, said threaded ends being secured to said respective pivot arm assemblies by appropriately threaded nuts.

14. The rotary rock windrower as set forth in claim 12, further comprising a pair of support brackets connected to said front frame, said reel pivot arm assemblies each including a pair of spaced forward plates having a tube extending therethrough and a pivot pin extending through said tube and the respective support bracket, said pin having a stub end and a threaded end and being secured to the outside of said bracket.

15. The rotary rock windrower as set forth in claim 2, wherein said front, rear and side frames comprise tubing of non-circular cross section.

16. The rotary rock windrower as set forth in claim 15, further comprising first and second substantially identical wheel assemblies each of which include means for adjustably mounting same to any desired position along said rear frame during operation of said rock windrower.

* * * * *